Patented Oct. 13, 1942

2,298,284

UNITED STATES PATENT OFFICE 2,298,284

REDUCTIVE ALKYLATION

William S. Emerson, Urbana, Ill.

No Drawing. Application May 2, 1940,
Serial No. 332,975

16 Claims. (Cl. 260—577)

The present invention relates to the reductive alkylation of amines and nitro compounds by means of aldehydes or ketones and hydrogen gas in the presence of a hydrogenation catalyst and a condensing agent or catalyst such as sodium acetate. The invention relates particularly to alkylation in the nitrogen-containing radical of the amine or nitro compound to produce N-alkyl substituted amines. The invention also relates to methods of controlling or entirely avoiding the formation of tertiary amines (N-dialkyl amines) in the production of secondary amines (N-monoalkyl amines) from primary amines or nitro compounds.

The principal objects of the present invention are to provide a simple and economical method of obtaining N-alkylated amines by the reduction with hydrogen of an aldehyde or a ketone and an amine or a nitro compound or an intermediate condensation product of one of the specified carbonyl compounds and one of the nitrogen compounds. Another object of the invention is to provide a method of such reductive alkylation of nitrogen compounds whereby the yield of secondary N-monoalkylated amines may be controlled to the extent of suppressing or entirely eliminating the formation of tertiary N-dialkylated amines. Other objects and advantages of the invention, some of which are specifically referred to hereinafter, will be apparent to those skilled in the art.

Various methods for the reductive N-alkylation of aromatic and aliphatic amines or nitro compounds by means of a carbonyl compound such as an aldehyde or ketone together with hydrogen have heretofore been known. These may be described briefly as follows:

1. Reductive alkylation by means of nascent hydrogen generated in situ from the reaction of a metal such as zinc and an acid. Such methods are described in German Patents Nos. 376,013, 491,856, 503,113; French Patent No. 485,282; and British Patent No. 118,298 (1918).

2. Reductive alkylation by means of hydrogen gas at temperatures of 50° to 200° C. under pressures of from 50 to 150 atmospheres in the presence of a nickel catalyst. Such a method is described in U. S. Patent No. 2,045,574.

3. Reductive alkylation of para-nitro or para-nitrosophenols by means of hydrogen gas with a ketone in the presence of a platinum catalyst at room temperature and atmospheric pressure. Such a method of preparation is described in U. S. Patent No. 1,978,433 but the inventor thereof has shown (Journal of the American Chemical Society, 1931, vol. 53, page 1902) that such reaction is not applicable to reductive alkylation with aliphatic aldehydes but is adaptable only to reductive alkylation with benzaldehyde and that it is not applicable to the reductive alkylation of nitrobenzene with acetone.

I have now discovered that N-alkylated aromatic and aliphatic amines may be prepared by the reaction of aromatic and aliphatic amines or nitro compounds with hydrogen and a carbonyl compound such as an aldehyde or ketone in the presence of a hydrogenation catalyst and a condensing agent such as sodium acetate under moderate pressures of about 2 to 3 atmospheres while the temperature of the mixture which may be initially at room temperature is allowed to rise as the reaction progresses by the exothermic heat of the reaction. With large batches the temperature should be controlled by cooling to prevent too vigorous reaction. The reaction may be generally conducted without the addition of extraneous heat. By observing such reaction conditions primary amines or nitro compounds can be converted to secondary N-monoalkylated amines without the formation of any substantial proportions of tertiary N-dialkylated amines and secondary amines may be further alkylated on the nitrogen atom to tertiary amines.

The use of sodium acetate or similar condensing agent in such reaction is novel. Alkylations which have not heretofore been possible to effect under such mild reaction conditions, for example, reductive alkylation with aliphatic aldehydes as stated above, can be easily conducted with good resulting yields of secondary amines by the use of sodium acetate. Several heretofore unknown N-alkylated amines have been prepared by means of this new process. The use of the sodium acetate facilitates heretofore known reductive alkylations which have been effected with ketones and provides an advantageous method of control of such reactions. Furthermore, the use of sodium acetate avoids the high temperature and high pressure reaction conditions specified in U. S. Patent No. 2,045,574.

The mechanism by virtue of which sodium acetate acts in the present process is not clearly understood. In my publications in the Journal of the American Chemical Society (I: 1938, vol. 60, pages 2023 to 2025; II: 1939, vol. 61, pages 3145 to 3146; and III: 1940, vol. 62, pages 69 to 70) I have advanced a theory of the mechanism but it is to be understood that the present invention is not to be limited by theoretical considerations. My foregoing publications are referred to for the purpose of extending but not as limiting the present disclosure and are to be so considered as a part hereof. In my description I have referred to sodium acetate as a condensing agent but whether the part it plays in the reaction is that of a condensation catalyst or whether it is more intricately connected with the reaction or has an effect on the hydrogenation catalyst has not been definitely ascertained and hence the term condensing agent or condensation catalyst as used herein and as applied to sodium acetate and similar substances is to be thus interpreted.

In the examples which follow, typical methods of practicing the process of my invention are set forth:

Example I.—N-ethylaniline

Into an apparatus for catalytic reduction, preferably provided with a stirrer or means for shaking, are placed 93 grams (about 1 mol) of aniline dissolved in 1500 cc. of 95% ethyl alcohol and about 88 grams (about 2 mols) of acetaldehyde, 10 to 20 grams of fused sodium acetate, and about 30 grams of Raney nickel catalyst, which may be prepared by the method of Covert and Adams described in the Journal of the American Chemical Society, 1932, vol. 54, page 4116. The apparatus is evacuated and then an initial pressure of about 3 atmospheres (45 lbs. per square inch) of hydrogen is applied. The apparatus is maintained at room temperature and the hydrogen is maintained at a pressure of about 3 atmospheres during absorption thereof. After hydrogen is no longer absorbed, which may be after an hour or more depending upon the rate of absorption, the reduction is stopped and the catalyst is removed by filtration. The solution is acidified slightly and the alcohol is distilled off. The remaining oil is then made slightly alkaline and fractionated, under vacuum if desired. N-ethylaniline has a distilling point of 204° C. The yield is about 58% of the theoretical, based on the aniline used.

Example II.—N-n-heptylaniline

By proceeding as in Example I, using from 2 to 5 mols of heptaldehyde instead of acetaldehyde and fractionating the product in vacuum, N-n-heptylaniline is obtained.

N-n-heptylaniline has a boiling point of 125° to 130° C. at a pressure of 30 mm., a specific gravity of 0.906 at 20°/20° and a refractive index at 20° C. of 1.5080 for the sodium D line.

Example III.—N-n-butyl-alpha-naphthylamine

By proceeding as in Example I but substituting butyraldehyde for acetaldehyde and alpha-naphthylamine for aniline in molecular proportions, and fractionating the product in vacuum, N-n-butyl-alpha-naphthylamine is obtained in 80% of the theoretical yield.

The new compound, N-n-butyl-alpha-naphthylamine, has a boiling point of 155° to 167° C. at a pressure of 8 mm., a specific gravity of 1.004 at 20°/20° and a refractive index of 1.5963 at 20° C. for the sodium D line. Its hydrochloride melts at 151° to 152° C.

Example IV.—N-ethyl-p-anisidine

By proceeding as in Example I but substituting p-anisidine for aniline in molecular proportions and fractionating the product, N-ethyl-p-anisidine is obtained in 51% yield.

N-ethyl-p-anisidine has a boiling point of 135° to 140° C. at a pressure of 20 mm., a specific gravity of 1.017 at 20°/20° and a refractive index of 1.5444 at 20° C. for the sodium D line. Its para-bromobenzenesulfonamide melts at 113° to 114° C.

Example V.—N-n-butyl-p-anisidine

By substituting butyraldehyde for acetaldehyde in molecular proportions in Example IV and proceeding as therein described, N-n-butyl-p-anisidine is obtained in 65% yield.

This new compound, N-n-butyl-p-anisidine, has a boiling point of 142° to 145° C. at a pressure of 6 mm., a specific gravity of 0.963 at 20°/20° and a refractive index of 1.5207 at 20° C. for the sodium D line. Its hydrochloride melts at 187.5° to 188° C.

Example VI.—N-n-butylaniline from nitrobenzene

Into an autoclave provided with a stirrer are placed 123 grams (about 1 mol) of freshly distilled nitrobenzene, 20 grams of fused sodium acetate, 1500 cc. of 95% ethyl alcohol, 94 grams (about 1.3 mol) of freshly distilled n-butyraldehyde and 30 grams of Raney nickel catalyst. The autoclave is evacuated and thereafter an initial pressure of 3 atmospheres of hydrogen is applied to the autoclave and the mixture is maintained at room temperature. After about 4 mols of hydrogen have been absorbed, the reduction is stopped and the catalyst is removed by filtration or decantation. The filtrate is made slightly acid with hydrochloric acid and the alcohol is distilled off. The residue is then diluted with about 1000 cc. of water and made slightly alkaline with sodium hydroxide. It may be subsequently extracted with ether and the extracts combined and after evaporation of the ether, fractionally distilled. However, the original residue without dilution with water may be made basic and then subjected to vacuum distillation. The product, N-n-butylaniline, is obtained in a yield of about 77% to 81% of the theoretical and has a boiling point of 235° to 245° C.

Example VII.—N-di-n-butyl-p-aminophenol

When p-nitrophenol is substituted in Example VI for nitrobenzene and butyraldehyde is present in excess, the product obtained is substantially all N-di-n-butyl-p-aminophenol.

Example VIII.—p-chloro-n-butylaniline

By substituting p-chloronitrobenzene for nitrobenzene in molecular proportions in Example VI, the product obtained consists of unalkylated p-chloroaniline, a fraction boiling at 105° to 145° C. at 25 mm. consisting of n-butylaniline and p-chloro-n-butylaniline and higher boiling fractions in which occurs p-chloro-n-butylaniline.

Example IX.—N-di-n-heptyl-p-toluidine

By substituting heptaldehyde for butyraldehyde and p-nitrotoluene for nitrobenzene in molecular proportions in Example VI and proceeding as therein otherwise described, N-mono-n-heptyl-p-toluidine and N-di-n-heptyl-p-toluidine are obtained, the latter in a yield of 34% of the theoretical. The latter compound, N-di-n-heptyl-p-toluidine, is a new compound and has a boiling point of 175° to 200° C. at a pressure of 2.5 mm., a specific gravity of 0.943 at 20°/20° and a refractive index of 1.5089 at 20° C. for the sodium D line. Its hydrochloride melts at 136° C.

Example X.—N-ethylaniline

By substituting 2 grams of a platinum oxide catalyst prepared according to the method of Adams, Voorhees and Shriner ("Organic Syntheses", Coll. Vol. I, 1932, page 452) for the Raney nickel catalyst and proceeding otherwise as in Example I, N-ethylaniline is obtained in a yield of 41% of the theoretical.

Example XI.—N-benzyl-alpha-naphthylamine

By substituting benzaldehyde for acetaldehyde and alpha-naphthylamine for aniline in molecular proportions in Example I and proceeding as otherwise therein indicated, benzyl-alpha-naphthylamine is obtained. Its benzamide has a melting point of 103° to 104° C.

The process of the invention is applicable to the reductive alkylation of aliphatic and aromatic amines such as aniline, p-toluidine, p-anisidine, alpha-naphthylamine, beta-naphthylamine, phenylpropylamine, and the like and the reductive alkylation of aromatic and aliphatic nitro compounds such as nitromeththane, nitrobenzene, p-nitrotoluene, p-chloronitrobenzene, p-nitrophenol, p-nitroanisole, alpha-nitronaphthalene and beta-nitronaphthalene. With some of these nitrogen compounds, such as p-nitrotoluene, the formation of tertiary amine is more difficult to suppress than with others but reduction of tertiary amine formation is possible in all cases and the reaction is controllable to some extent by varying the reaction conditions and the content of sodium acetate or other condensing agents in the reaction. The position of the other substituents in the compound is not of importance although para-substituted compounds appear to be more active in the reaction than the corresponding ortho or meta-substituted isomers.

Carbonyl compounds which may be used in the reaction include both aliphatic as well as aromatic aldehydes and aliphatic ketones. Examples of such aldehydes and ketones are formaldehyde, acetaldehyde, propionaldehyde, butyraldehyde, pentaldehyde (amyl aldehyde), hexaldehyde, heptaldehyde, benzaldehyde, acetone, ethyl methyl ketone, diethyl ketone and the like. It is to be understood that the term alkylation as used herein and in the claims refers to benzylation and similar aralkylations by means of benzaldehyde and the like. The process of the invention, however, finds its greatest applicability in the case of aliphatic aldehydes whose use in such reactions has not heretofore been possible in a facile manner. Generally branched-chain aldehydes or ketones do not react as readily as straight-chain compounds.

Although I have particularly referred to mixtures of carbonyl compounds and nitrogen compounds I may use herein condensation products of the two or intermediate compounds of the reductive alkylation reaction.

As hydrogenation catalysts for the reaction, Raney nickel catalysts, platinum black, palladium black, platinum oxide and similar active catalysts are preferred. Catalysts such as copper chromite are not operative at the low temperatures contemplated by the present process. In general, to prepare secondary amines to the substantial exclusion of tertiary amines, neutral or slightly alkaline conditions should be maintained. Acid conditions, as shown in my publication listed as I hereinabove, cannot be used with certain aldehydes. With respect to catalysts it should be noted that certain hydrogenation catalysts are more sensitive to chlorine compounds than others and hence if the compounds involved in any particular reaction contain halogen substituents proper selection of a catalyst to avoid complications should be made.

Sodium acetate is the preferred condensing agent for use in my process. The fused product is preferred. By the use of the fused sodium acetate the formation of tertiary amines can be avoided in most instances. However, sodium carbonate, sodium formate, sodium stearate, and, in general, other alkali metal salts of weak organic acids may be used with advantage. As shown in my publication hereinabove referred to as I, sodium hydroxide gives a lower yield of product when used as condensing agent than sodium acetate and in some cases completely suppresses reaction. In the following table are shown the effects of various condensing agents on the reaction of butyraldehyde and 0.10 mol of nitrobenzene in the presence of 3 grams of Raney nickel catalyst. The yields are expressed as per cent of secondary (N-n-butylaniline) and tertiary amines (N-n-dibutyl aniline) respectively. It is to be noted that in Run 7 the medium containing trimethylamine hydrochloride, which is an acid medium, yields tertiary amine to the substantial exclusion of secondary amine.

| Run | Mols hydrogen absorbed | Mols butyraldehyde present | Solvent | Condensing agent | Per cent yield | |
|---|---|---|---|---|---|---|
| | | | | | Secondary amine | Tertiary amine |
| 1 | 0.56 | 0.30 | Alcohol | 2 g. sodium acetate. | 92 | |
| 2 | 0.42 | 0.10 | do | do | 74 | |
| 3 | 0.42 | 0.12 | do | do | 77 | |
| 4 | 0.39 | 0.13 | do | do | 74 | |
| 5 | 0.44 | 0.13 | do | do | 81 | |
| 6 | 0.40 | 0.13 | Dioxane | do | 74 | 12 |
| 7 | 0.41 | 0.13 | Alcohol | 2 g. trimethyl amine hydrochloride. | | 63 |
| 8 | 0.42 | 0.13 | do | 2 g. sodium formate. | 47 | 15 |
| 9 | 0.41 | 0.13 | do | 2 g. sodium carbonate. | 27 | 20 |
| 10 | 0.43 | 0.13 | do | 5 cc. 40% trimethylamine | 30 | 15 |

Of the solvents which may be used, 95% ethyl alcohol is preferred, although ethyl acetate, dioxane, methyl alcohol, isopropyl alcohol, isopropyl ether and the like, are optional solvents. The essential requisite of the solvent is that it be inert in the reaction and that it dissolve the condensing agent.

The proportion of reactants in the reaction mixture is not of paramount importance. Generally the carbonyl compound should be in excess since the yields are thereby increased. Effect of this variation is shown in the table hereinabove. Usually 13 mols of butyraldehyde, for example, to 10 mols of nitrobenzene give satisfactory yields although the optimum ratio for different aldehydes and nitrogen compounds will vary somewhat. Generally, 10 grams to 20 or more grams of fused sodium acetate should be used to each mol of nitrogen compound in the reaction. The yields are not appreciably changed by the presence of greater proportions.

The temperatures which may be used in the reaction vary from normal room temperatures to approximately 100° C., although the preferred range is about 10° to 40° C. Generally the reaction will proceed without the addition of extraneous heat and with large batches cooling may be desirable to control the reaction. Likewise, the pressures may be varied greatly from normal atmospheric pressure to 10 or more atmospheres. Preferred pressure conditions, however, are from 2 to 4 atmospheres.

Inasmuch as the foregoing description comprises preferred embodiments of my invention it is to be understood that my invention is not to be limited thereto and that modifications and variations may be made to adapt the invention to other specific uses without departing substantially from its spirit or scope as defined in the appended claims.

Reference is made to my co-pending application, Serial Number 370,355, filed December 16, 1940, in which is claimed matter disclosed but not claimed herein.

I claim:

1. In the method of reductive alkylation of a compound selected from the group consisting of primary and secondary aliphatic and aromatic amines and aliphatic and aromatic nitro compounds by means of hydrogen and a carbonyl compound selected from the group consisting of aldehydes and ketones in the presence of a hydrogenation catalyst, the improvement consisting in conducting said reductive alkylation in the presence of a condensing agent consisting of an alkali-metal salt of a weak organic acid.

2. The method as defined in claim 1 and further characterized in that the condensing agent is sodium acetate.

3. The method as defined in claim 1 and further characterized in that the hydrogenation catalyst is a Raney nickel catalyst.

4. The method as defined in claim 1 and further characterized in that the hydrogenation catalyst is a Raney nickel catalyst and the condensing agent is sodium acetate.

5. The process of producing an N-alkylated aromatic amine comprising the hydrogenation of a mixture of an aromatic nitro compound and a carbonyl compound selected from the group consisting of aldehydes and ketones in the presence of a hydrogenation catalyst and a condensing agent consisting of an alkali-metal salt of a weak organic acid.

6. The method as defined in claim 5 and further characterized in that the condensing agent is sodium acetate.

7. The method as defined in claim 5 and further characterized in that the hydrogenation catalyst is a Raney nickel catalyst.

8. The method as defined in claim 5 and further characterized in that the hydrogenation catalyst is a Raney nickel catalyst and the condensing agent is sodium acetate.

9. The process of producing an N-alkylated aromatic amine comprising the hydrogenation of a mixture of a primary aromatic amine and a carbonyl compound selected from the group consisting of aldehydes and ketones in the presence of a hydrogenation catalyst and a condensing agent consisting of an alkali-metal salt of a weak organic acid.

10. The method as defined in claim 9 and further characterized in that the condensing agent is sodium acetate.

11. The method as defined in claim 9 and further characterized in that the hydrogenation catalyst is a Raney nickel catalyst.

12. The method of producing an N-alkylated amine comprising the hydrogenation of a mixture of two compounds, one of which is an organic nitrogen compound selected from the group consisting of primary and secondary aliphatic and aromatic amines and aliphatic and aromatic nitro compounds and the other of which is a carbonyl compound selected from the group consisting of aldehydes and ketones in the presence of a Raney nickel catalyst and sodium acetate at a temperature within the range of approximately 15° to 100° C. and at a pressure of approximately 1 to 4 atmospheres.

13. The method of producing N-ethylaniline comprising the hydrogenation of a mixture of acetaldehyde and nitrobenzene in the presence of a hydrogenation catalyst and sodium acetate at a temperature within the range of approximately 15° to 100° C. and at a pressure of approximately 1 to 4 atmospheres.

14. The method of producing N-ethylaniline comprising the hydrogenation of a mixture of acetaldehyde and nitrobenzene in the presence of a Raney nickel catalyst and sodium acetate at a temperature within the range of approximately 15° to 100° C. and at a pressure of approximately 1 to 4 atmospheres.

15. The process of producing N-n-butylaniline comprising the hydrogenation of a mixture of butyraldehyde and nitrobenzene in the presence of a Raney nickel catalyst and sodium acetate at a temperature within the range of approximately 15° to 100° C. and at a pressure of approximately 1 to 4 atmospheres.

16. The process of producing N-ethylaniline comprising the hydrogenation of a mixture of acetaldehyde and aniline in the presence of a Raney nickel catalyst and sodium acetate at a temperature within the range of approximately 15° to 100° C. and at a pressure of approximately 1 to 4 atmospheres.

WILLIAM S. EMERSON.